Figure 1:
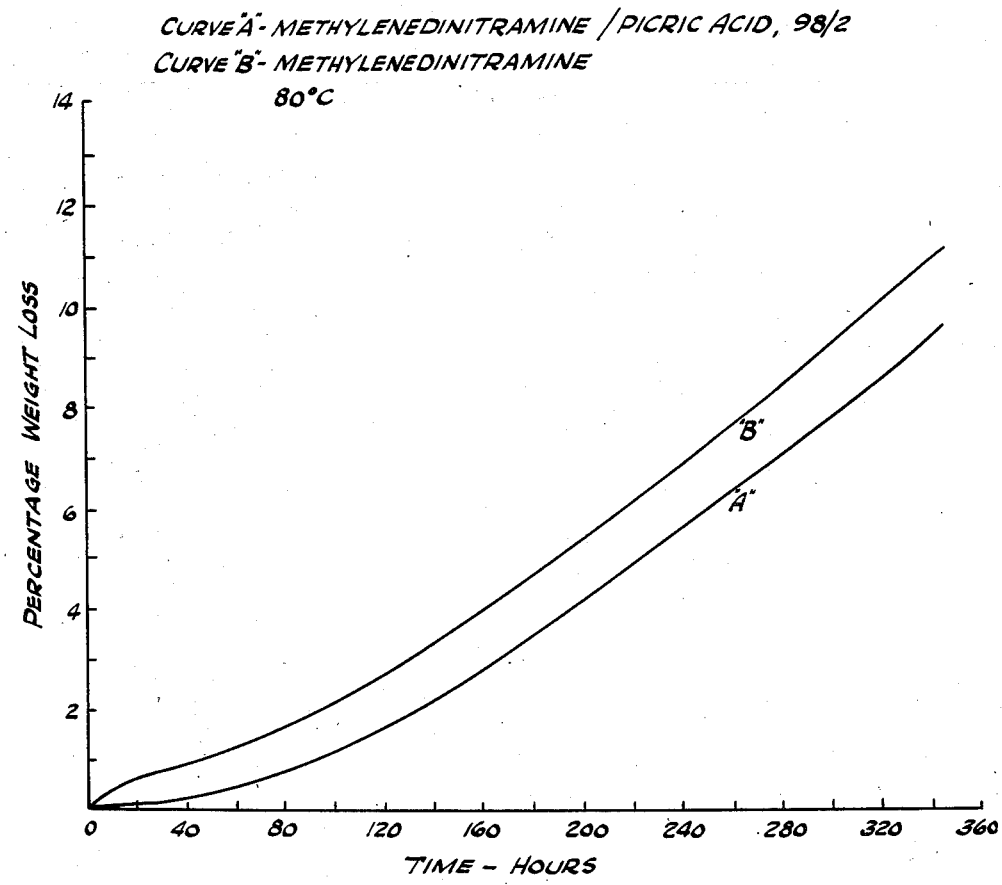

2,786,078
STABILIZATION OF METHYLENEDINITRAMINE

Charles W. Sauer, Cambridge, Mass., assignor to Arthur D. Little, Inc., Cambridge, Mass., a corporation of Massachusetts Application January 24, 1955, Serial No. 483,760

6 Claims. (Cl. 260—583)

This invention relates to the stabilization of organic compounds and more particularly to the stabilization of nitramines.

Nitramines may be identified as those organic compounds which contain one or more =N—NO$_2$ groupings. Many of these nitramines are known to make good explosive components because of the energy released in the breaking of the =N—NO$_2$ group. However, the fact that the decomposition of this group upon detonation releases a comparatively large amount of energy means also that the group possesses some inherent instability. Such instability is more marked in compounds which contain two primary nitramine groups on the same carbon atom as in methylenedinitramine

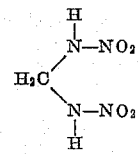

It is, therefore, desirable to stabilize such nitramines with a material which will not itself materially detract from the use of these nitramines, e. g., reduce their explosive energy.

It is, therefore, an object of this invention to stabilize certain nitramines, i. e., to materially reduce their decomposition over a long period of time. It is a further object of this invention to make an explosive component which will be thermally stable but will not have its explosive properties substantially impaired.

There appears to be very little literature or work done on decomposition in the solid state. The few studies which have been made point to the fact that decomposition of a solid proceeds from nuclei which form primarily on the surface of the solid crystals. If this is the true explanation, then coating the nitramine particles with a suitable material should stabilize the nitramine. I have found that a surface coating of a polynitrophenol or of a polynitroaromatic carboxylic acid on methylenedinitramine increases the thermal stability of the methylenedinitramine at temperatures below the melting point of the nitramine.

The stabilizer may be applied by adsorption or recrystallization from a solvent containing the additive, or by evaporation from a non-solvent for the methylenedinitramine.

The stabilizer is a polynitrophenol such as picric acid, styphnic acid, 2,4-dinitrophenol or a polynitroaromatic carboxylic acid such as 3,5-dinitrobenzoic acid. The polynitrophenols are especially effective and picric acid is the preferred stabilizer.

A number of samples of methylenedinitramine were coated with a variety of stabilizers by dissolving the stabilizer in a liquid which was a solvent for the stabilizer and not for the methylenedinitramine. Vacuum stability tests were then run on the samples after they had been well dried. These tests were conducted at 75° C. One gram samples were employed and Table I gives the milliliters of gas per gram per hour released by the samples.

TABLE I
*Vacuum stability data for stabilized methylenedinitramine*

| Stabilizer | Percent Stabilizer [1] Added to Solvent [2] | Vacuum Stability, ml./hr. for 1 gram |
|---|---|---|
| None-control | | 2.8/2.5 |
| Picric Acid | 25 | 0.34, 0.24/65 |
| 3-5 Dinitrobenzoic acid | 25 | 6.54, 4.1/65 |
| None-control | | 1.2, 1.4/83 |
| Picric Acid | 25 | 0.71, 0.7/70 |
| None-control | | >16/8 |
| Picric Acid | 15 | 4.2/40 |
| Do | 20 | 3.9, 3.6/40 |
| Do | 25 | 3.0, 3.2/40 |
| Styphnic Acid | 25 | 2.3, 2.9/40 |

[1] In terms of weight percent of methylenedinitramine.
[2] Solvent was a 9:1 by volume mixture of ethylene chloride and isopropyl alcohol.

In the examples in Table I, the actual stabilizer content deposited on the crystals ranged from about 0.10 to about 2.0 percent by weight of the methylenedinitramine. It will be seen from the data in Table I that the stabilizers used were quite effective in reducing the gas evolution from methylenedinitramine.

In addition to the vacuum stability tests which were run, several determinations of weight loss were made for purified methylenedinitramine and methylenedinitramine/picric acid, 98/2. The samples containing the picric acid were made by intimately mixing the pure methylenedinitramine with 2 percent its weight of picric acid. Enough benzene (a non-solvent for the methylenedinitramine) was added to form a slurry and the mixture was stirred for one minute and vacuum dried. Fig. 1 illustrates the weight losses from stabilized and unstabilized samples of methylenedinitramine and clearly indicates the decrease in loss achieved by the stabilized sample.

I claim:

1. Methylenedinitramine crystals stabilized with a coating of a stabilizer taken from the group consisting of picric acid, styphnic acid, 2,4-dinitrophenol, and 3,5-dinitrobenzoic acid, said stabilizer being present in a concentration of from about 0.1 to 2.0 percent by weight of said methylenedinitramine.

2. Methylenedinitramine crystals stabilized with a coating of styphnic acid, said styphnic acid being present in a concentration of from about 0.1 to 2.0 percent by weight of said methylenedinitramine.

3. Methylenedinitramine crystals stabilized with a coating of picric acid, said picric acid being present on said methylenedinitramine crystals in a concentration from about 0.1 to 2.0 percent by weight of the methlenedinitramine.

4. A method of stabilizing methylenedinitramine which comprises depositing on said methylenedinitramine a coating of a stabilizer, said stabilizer being taken from the group consisting of picric acid, styphnic acid, 2,4-dinitrophenol and 3,5-dinitrobenzoic acid and being present in a concentration of from about 0.1 to 2.0 percent by weight of said methylenedinitramine.

5. A method of stabilizing methylenedinitramine in accordance with claim 4 wherein the stabilizer is picric acid.

6. A method of stabilizing methylenedinitramine in accordance with claim 4 wherein the stabilizer is styphnic acid.

References Cited in the file of this patent

Ostwald et al.: Kolloid-Zeitschrift, 227–232, 249–267 (1927).